United States Patent
Kraemer

(10) Patent No.: US 11,400,895 B2
(45) Date of Patent: Aug. 2, 2022

(54) WIPER ARM DEVICE WITH AT LEAST ONE DETACHABLE AUXILIARY NOZZLE UNIT

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 17/004,806

(22) Filed: Aug. 27, 2020

(65) Prior Publication Data

US 2021/0061234 A1 Mar. 4, 2021

(30) Foreign Application Priority Data

Aug. 28, 2019 (DE) .......................... 102019212911.0

(51) Int. Cl.
 *B60S 1/52* (2006.01)
(52) U.S. Cl.
 CPC ..................................... *B60S 1/522* (2013.01)
(58) Field of Classification Search
 CPC ....................................................... B60S 1/522
 See application file for complete search history.

(56) References Cited

U.S. PATENT DOCUMENTS 3,008,649 A * 11/1961 Bock .......................... B60S 1/52
 239/284.1

FOREIGN PATENT DOCUMENTS

DE 202017007016 U1 5/2019

OTHER PUBLICATIONS

DE202017007016U1_machine_translation_ (Year: 2019).*

* cited by examiner

*Primary Examiner* — Andrew A Horton
(74) *Attorney, Agent, or Firm* — Micheal Best & Friedrich LLP

(57) ABSTRACT

A wiper arm device with at least one duct connecting unit (10) for connecting at least two wiper fluid duct sections to each other, with at least one duct retaining unit (14) which can be arranged on at least one wiper arm (12) and is configured in order to retain at least the duct connecting unit (10) on the wiper arm (12) and with at least one auxiliary nozzle unit (16). The wiper arm device has a connecting unit (18) which is configured in order to connect the at least one auxiliary nozzle unit (16) detachably to the duct connecting unit (10), in particular non-destructively.

21 Claims, 4 Drawing Sheets

WIPER ARM DEVICE WITH AT LEAST ONE DETACHABLE AUXILIARY NOZZLE UNIT

BACKGROUND OF THE INVENTION

A wiper arm device with at least one duct connecting unit for connecting at least two wiper fluid duct sections to each other has already been proposed, with at least one duct retaining unit which can be arranged on at least one wiper arm and is configured in order to retain at least the duct connecting unit on the wiper arm and with at least one auxiliary nozzle unit.

SUMMARY OF THE INVENTION

The invention is based on a wiper arm device with at least one duct connecting unit for connecting at least two wiper fluid duct sections to each other, with at least one duct retaining unit which can be arranged on at least one wiper arm and is configured in order to retain at least the duct connecting unit to the wiper arm and with at least one auxiliary nozzle unit.

It is proposed that a connecting unit is configured in order to connect the auxiliary nozzle unit detachably to the duct connecting unit, in particular non-destructively.

The duct connecting unit is preferably configured in order to fluidically connect the at least two wiper fluid duct sections to each other. In particular, the duct connecting unit delimits at least one further wiper fluid duct section. The duct connecting unit is preferably configured at least partially as a tube connecting unit. The duct connecting unit is preferably configured as a push-fit connecting unit, as a bayonet fastening unit, as a press-fit connecting unit, as a flange connecting unit, as a screwed connecting unit, as a clamping ring screwed connecting unit, as a crimped screwed connecting unit, as a sliding sleeve connecting unit, as a plug-in connecting unit, as an adhesive connecting unit, and/or as a socket connecting unit. The duct connecting unit particularly preferably has at least two coupling elements and at least two complementary coupling elements. The at least two coupling elements are preferably arranged on the duct connecting unit. The at least two coupling elements are preferably configured integrally with the duct connecting unit. "Integrally" is to be understood in particular to mean formed in one piece. This one piece is preferably produced from a single blank, a compound, and/or a casting, particularly preferably in an injection-molding process, in particular a single- or multi-component injection-molding process or an extrusion process. The at least two coupling elements are preferably each configured as hose connectors. The hose connector preferably has at least partially a conical outer contour. The hose connector preferably has at least partially a frustoconical outer contour. The hose connector preferably has an outer contour formed at least of two cones or part cones. In particular, at least one of the at least two complementary coupling elements is configured in order to be pushed onto at least one of the at least two coupling elements. The at least two complementary coupling elements preferably each have at least partially a cylindrical inner contour.

The wiper arm device in particular has at least one wiper fluid duct unit. The wiper fluid duct unit is preferably configured in order to conduct wiper fluid. The wiper fluid duct unit is preferably configured in order to conduct wiper fluid from a wiper fluid container to at least one spray nozzle. The wiper fluid duct unit preferably has at least one wiper fluid duct. The wiper fluid duct is preferably configured as a tube and/or as a hose. The at least one wiper fluid duct is preferably formed from at least two wiper fluid duct sections. The at least two wiper fluid duct sections are configured to be guided on the wiper arm. At least one of the at least two complementary coupling elements is furthermore preferably arranged on the duct connecting unit on at least one of the at least two wiper fluid duct sections. At least one of the at least two complementary coupling elements is preferably formed integrally with at least one of the at least two wiper fluid duct sections.

The duct retaining unit is in particular configured to be coupled to the wiper arm. In a state coupled to the wiper arm, the duct retaining unit is preferably connected to the wiper arm by means of a clamping connection, by means of an adhesive connection, by means of a screwed connection, by means of a magnetic connection, by means of a positive receiving element and/or by means of a snap connection. The duct retaining unit preferably has at least two duct retaining elements. The at least two duct retaining elements are preferably each configured to retain at least one of the at least two wiper fluid duct sections. The at least two duct retaining elements are furthermore preferably configured to retain and/or guide the at least two wiper fluid duct sections in each case on the wiper arm. The at least two duct retaining elements are preferably configured to guide and/or retain the at least two wiper fluid duct sections at least substantially parallel to a main axis of extension of the wiper arm. The "main axis of extension" of an object is here to be understood in particular as an axis that extends parallel to a longest edge of a smallest geometrical cube that only just completely encloses the object. In a state coupled to the duct retaining unit, at least one of the at least two wiper fluid duct sections is preferably connected to at least one of the at least two duct retaining elements by means of a clamping connection, by means of an adhesive connection, by means of a screwed connection, by means of a magnetic connection, by means of a positive receiving element, and/or by means of a snap connection. The duct retaining unit particularly preferably has at least one duct connection retaining element. The at least one duct connection retaining element is preferably configured to couple the duct connecting unit to the wiper arm and/or retain it on the wiper arm. The at least one duct connection retaining element is preferably configured to retain the duct connecting unit by means of a clamping connection, by means of an adhesive connection, by means of a screwed connection, by means of a magnetic connection, by means of a positive receiving element, and/or by means of a snap connection. The duct connecting unit can in particular alternatively be formed integrally with the duct retaining unit.

The at least one auxiliary nozzle unit is preferably configured to discharge wiper fluid. The at least one auxiliary nozzle unit preferably has a fluidic connection to at least one of the at least two wiper fluid duct sections. The at least one auxiliary nozzle unit preferably has at least one auxiliary nozzle element. The at least one auxiliary nozzle element preferably delimits at least one auxiliary nozzle opening. The at least one auxiliary nozzle opening is preferably at least largely delimited cylindrically and/or conically by the at least one auxiliary nozzle element. The term "largely" is to be understood to mean in particular at least 55%, advantageously at least 65%, preferably at least 75%, particularly preferably at least 85%, and particularly advantageously at least 95% of a closed volume, a closed area, and/or a closed line of a reference object. The at least one auxiliary nozzle unit preferably has a main spraying direction. The main spraying direction is preferably at least substantially parallel to a main axis of extension of the at least one auxiliary nozzle opening.

The connecting unit is in particular configured in order to provide a non-destructively detachable connection. The connecting unit can furthermore be configured so as to be destroyed in the event of separation. In a state connected to and/or by the connecting unit, the at least one auxiliary nozzle unit and the duct connecting unit can particularly preferably be separated from each other non-destructively. The connecting unit is in particular formed as an adhesive connection, a screwed connection, a magnetic connection, an adhesive connection, a snap connection, and/or a plug-in connection. The connecting unit preferably has at least one connecting element. The at least one connecting element is preferably configured in order to connect the at least one auxiliary nozzle unit detachably to the duct connecting unit. The at least one connecting element is preferably formed as a double-sided adhesive strip or as a permanent magnet. The connecting unit in particular has at least two connecting elements. The connecting unit preferably has at least one connecting element and at least one further connecting element. The at least one connecting element is preferably arranged on at least one auxiliary nozzle element. The at least one further connecting element is preferably arranged on the at least one duct connection retaining element. The at least one connecting element is particularly preferably configured in order to be connected detachably to the at least one further connecting element. The at least one connecting element can preferably be separated non-destructively from the at least one further connecting element and/or is formed detachably. By virtue of the embodiment according to the invention, a wiper arm device can be obtained which can have a particularly advantageous flexible design. The capacity for retrofitting and/or adaptation to existing wiper arm devices can advantageously be improved. A particularly easily modifiable wiper arm device can particularly advantageously be provided. A particularly advantageous easy-to-maintain and/or low-maintenance wiper arm device can be provided. Very particularly advantageously, any desired number of auxiliary nozzle units can be arranged particularly flexibly on a wiper arm in order to form a nozzle chain. Furthermore, an auxiliary nozzle unit can advantageously be arranged in, as far as possible, any desired region along a wiper arm in order to supply specific positions of the wiper with wiper fluid. Moreover, a specific auxiliary nozzle unit can particularly advantageously be obtained depending on a specific position of the duct connecting unit.

It is furthermore proposed that the connecting unit has a connection axis for the purpose of connecting the at least one auxiliary nozzle unit to the duct connecting unit and which extends transversely with respect to a main axis of extension of the duct connecting unit. "Transversely" is to be understood here to mean in particular an orientation of a direction and/or an axis relative to a reference direction and/or a reference axis, the orientation of the direction and/or the axis being at least different from an at least substantially parallel orientation with respect to the reference direction and/or the reference axis and being in particular skewed or perpendicular with respect to the reference direction and/or the reference axis. The auxiliary nozzle unit can preferably be connected to the duct connecting unit along the connection axis. The at least two connecting elements can preferably be connected and/or separated along and/or in a rotational movement or pivoting movement about the connection axis. The main axis of extension of the duct connecting unit preferably extends at least substantially parallel to the main axis of extension of the wiper arm and/or a main axis of extension of the at least one wiper fluid duct. "Substantially parallel" is here in particular understood to mean an orientation of a direction relative to a reference direction, in particular within a plane, the direction with respect to the reference direction having a deviation in particular of less than 8°, advantageously less than 5°, and particularly advantageously less than 2°. By virtue of the embodiment according to the invention of the wiper arm device, a targeted discharge of wiper fluid onto a surface to be wiped can advantageously be provided. A connecting unit which can advantageously be employed flexibly can furthermore be provided. Auxiliary nozzle units can advantageously be connected in series. Furthermore, auxiliary nozzle units can advantageously be connected to the duct connecting unit at an independent position one from the other.

It is moreover proposed that the connecting unit has at least one connecting element, in particular at least one of the abovementioned connecting elements which is formed integrally with the at least one auxiliary nozzle unit or the duct connecting unit. The at least one connecting element of the connecting unit is preferably integrally formed with at least one auxiliary nozzle element. The at least one further connecting element of the connecting unit is particularly preferably integrally formed with the at least one duct connection retaining element. In the separated state of the connecting unit, the at least two connecting elements are in particular detached from one another, in particular non-destructively. By virtue of the embodiment according to the invention, the capacity to retrofit the wiper arm device can advantageously be obtained. The number of different parts can furthermore advantageously be kept low. The capacity for simple mounting and/or dismounting can moreover advantageously be provided.

It is furthermore proposed that the connecting unit has at least two connecting elements formed as plug-in coupling elements. The at least one connecting element is preferably formed as a plug-in coupling element. The at least one further connecting element is preferably formed as a further plug-in coupling element. The plug-in coupling elements are in particular configured in order to be connected to each other along the connection axis of the connecting unit. The at least two plug-in coupling elements can preferably be connected to each other and/or separated from each other without the use of tools. In the connected state of the connecting unit, the at least one plug-in coupling element is particularly preferably provided in order to retain the at least one further plug-in coupling element against a separating movement along the connection axis. The at least one plug-in coupling element in particular has a clamping region. The at least one further plug-in coupling element preferably has a complementary clamping region. The clamping region is particularly preferably configured in each case in order to engage in the complementary clamping region of the at least one further plug-in coupling element. The at least two plug-in coupling elements are in particular configured in order to be connected and/or separated by means of a threshold force being exceeded. The clamping region is preferably configured at least partially in order to be deflected elastically during mounting and/or dismounting. The clamping region is preferably formed as a projection. The projection is preferably formed resiliently. A "resilient element" is in particular understood to mean an element which can be deformed repeatedly without the element consequently being mechanically damaged or destroyed, and which independently tends to return to a basic shape in particular after being deformed. The complementary clamping region is preferably formed as a recess. The complementary clamping region is preferably formed with a shape that correlates with the clamping region. In the mounted state of the connecting unit, the projection is in particular configured in order to be received in the recess. Furthermore, in the mounted state, the projection is configured in order to establish a positive and a non-positive connection between the at least two plug-in coupling elements. The clamping region is preferably formed integrally with the at least one plug-in coupling element. The complementary clamping region is preferably formed integrally with the at least one further plug-in coupling element. Furthermore, it is in particular conceivable that alternatively the complementary clamping region is arranged on the at least one plug-in coupling element and the clamping region is arranged on the at least one plug-in coupling element. By virtue of the embodiment of the wiper arm device according to the invention, an advantageously simple possibility to exchange the auxiliary nozzle elements for flexible and/or position-dependent deployment can be provided. An advantageously easy-to-maintain wiper arm device can be provided. A particularly high degree of operational reliability can furthermore be provided. Undesired damage can advantageously be largely avoided. Secure and/or flexible attachment of the auxiliary nozzle unit can advantageously be obtained. Straightforward mounting and/or dismounting can moreover be provided.

It is moreover proposed that the connecting unit has at least one connecting element, in particular at least one of the abovementioned connecting elements, which at least partially has a lens shape, on which the at least one auxiliary nozzle unit is arranged. The at least one connecting element preferably has at least one head region. The at least one auxiliary nozzle unit is preferably arranged on an external contour of the at least one head region of the at least one connecting unit. The at least one auxiliary nozzle unit is particularly preferably formed integrally with the external contour of the at least one head region of the at least one connecting unit. At least two auxiliary nozzle units are preferably arranged on the external contour. The at least one head region in particular has a lens-shaped external contour. The external contour is preferably formed as a part of a surface of an ellipse. It is likewise conceivable that the at least one head region has an oval, conical, pyramidal, spherical, cuboid, and/or cylindrical external contour. The external contour preferably has a convex and/or concave form. By virtue of the embodiment according to the invention, the number of duct connecting units can advantageously be kept low. A flexibly deployable duct connecting unit can particularly advantageously be obtained. A plurality of auxiliary nozzle units can advantageously be arranged on a duct connecting unit. Furthermore, multiple auxiliary nozzle units with in particular different spraying directions can be provided on a duct connecting unit.

It is furthermore proposed that the connecting unit has at least one anti-rotation element which is configured in order to secure the at least one auxiliary nozzle unit and the duct connecting unit in a connected state of the connecting unit against rotational movement relative to each other. The at least one anti-rotation element is preferably arranged on the at least one connecting element. The at least one anti-rotation element is in particular configured in order to secure the at least one connecting element in the connected state of the connecting unit from rotational movement relative to the at least one further connecting element and/or the duct connecting unit. The at least one anti-rotation element is preferably formed at least partially as a projection and/or a recess. The at least one anti-rotation element is preferably formed as a stud or a web. The at least one anti-rotation element is preferably arranged on the at least one connecting element and/or on the at least one auxiliary nozzle unit. It is likewise conceivable that the at least one anti-rotation element is arranged on the at least one further connecting element and/or on the duct retaining unit. The connecting unit preferably has at least one safety mechanism receiving element. The at least one safety mechanism receiving element is configured in order to receive the at least one anti-rotation element. The at least one safety mechanism receiving element is preferably formed as a recess and/or a projection. The at least one safety mechanism receiving element is particularly preferably formed as a bush. The at least one safety mechanism receiving element is preferably formed with a shape that correlates with the at least one anti-rotation element. Then at least one safety mechanism receiving element is preferably arranged on the at least one further connecting element and/or on the duct retaining unit. It is likewise conceivable that the at least one anti-rotation element is arranged on the at least one connecting element and/or on the at least one auxiliary nozzle unit. In the connected state of the connecting unit, the at least one safety mechanism receiving element is particularly preferably configured in order to receive the at least one anti-rotation element, in particular in a direction along the connection axis of the connecting unit. In the connected state of the connecting unit, the at least one safety mechanism receiving element is particularly preferably configured in order to positively delimit a relative movement of the at least one connecting element with respect to the at least one further connecting element. By virtue of the embodiment according to the invention of the wiper arm device, a particularly advantageously reliable capacity for adaptation and/or retrofitting can be obtained. An advantageously easily modifiable wiper arm device can be provided. A main spraying direction can advantageously reliably be predetermined. Undesired drifting of a main spraying direction can furthermore advantageously be largely avoided. A particularly operationally reliable auxiliary nozzle unit can be provided.

It is moreover proposed that the at least one anti-rotation element is formed integrally with the at least one auxiliary nozzle unit. The at least one auxiliary nozzle unit is in particular formed integrally with the at least one connecting element and with the at least one anti-rotation element. Alternatively, the auxiliary nozzle unit can also be formed integrally with the at least one connecting element and the at least one safety mechanism receiving element. Furthermore, the at least one auxiliary nozzle unit can alternatively be formed integrally with the at least one further connecting element and the at least one anti-rotation element or the at least one safety mechanism receiving element. By virtue of the embodiment according to the invention of the wiper arm device, the capacity for simple mounting and/or dismounting can advantageously be obtained. The number of different parts can advantageously be kept low. A component which can advantageously be produced cost-effectively can moreover be provided.

It is furthermore proposed that the at least one anti-rotation element has a fluid duct for a fluidic connection of the at least one auxiliary nozzle unit to the duct connecting unit. The connecting unit in particular delimits the fluid duct. In particular, the at least one connecting element, the at least one further connecting element, the at least one anti-rotation element, the at least one safety mechanism receiving element, and/or the at least one auxiliary nozzle unit delimits the fluid duct at least partially. The fluid duct is preferably delimited by a circular, elliptical, oval, rectangular, and/or polygonal cross-section, in particular within a plane perpendicular to a connection axis of the connecting unit or a main axis of extension of the anti-rotation element. The fluid duct is furthermore configured in order to convey wiper fluid. The fluid duct is preferably configured in order to convey wiper fluid from the at least one further wiper fluid duct section delimited by the duct connecting unit to the at least one auxiliary nozzle unit. By virtue of the embodiment according to the invention of the wiper arm device, a structural space can advantageously be used efficiently. An existing structural space can advantageously be used. A short distance to travel and low fluidic resistance can furthermore be provided. The number of different parts can advantageously be kept low. Mechanical and/or fluidic mounting steps can advantageously be combined.

It is moreover proposed that the connecting unit has at least one support element which is configured in order to support the at least one auxiliary nozzle unit on the wiper arm and/or position it relative to the wiper arm. The at least one support element preferably has at least one support surface. The at least one support surface is configured in order to transmit a supporting force to the wiper arm in the coupled state of the duct connecting unit to the wiper arm and in the connected state of the connecting unit. The at least one support element furthermore preferably has at least one support arm. The at least one support arm is preferably configured in order to connect the at least one support surface to the at least one auxiliary nozzle unit. The at least one support element is preferably arranged on the at least one auxiliary nozzle unit. The at least one support element is preferably rigidly connected to the at least one auxiliary nozzle unit. The at least one support element is particularly preferably integrally formed with the at least one auxiliary nozzle unit. The at least one support surface of the at least one support element is in particular configured in order to orient the main spraying direction of the at least one auxiliary nozzle unit relative to the wiper arm. By virtue of the embodiment according to the invention, a particularly advantageously operationally reliable wiper arm device can be provided. A flexibly deployable wiper arm device can advantageously be obtained. The wiper arm device is advantageously largely independent of a geometry of the wiper arm. A particularly reliable capacity for retrofitting can advantageously be obtained. Auxiliary nozzle elements can advantageously be reliably and/or operationally reliably installed and/or retrofitted.

A connecting unit according to the invention is moreover proposed. By virtue of the embodiment according to the invention of the connecting unit, an advantageously secure attachment of the auxiliary nozzle unit can be obtained. A particularly advantageously secure capacity for attachment can be created. Damage and/or detachment can advantageously be prevented.

Moreover, a duct connecting unit according to the invention is furthermore proposed. The duct connecting unit preferably has at least one valve element. The at least one valve element is preferably formed as a three-way valve. The valve element is in particular configured in order to release or interrupt a flow of wiper fluid to the at least one auxiliary nozzle unit. The valve element is furthermore preferably configured in order to release or interrupt a flow of wiper fluid from at least one wiper fluid duct section to at least one further wiper fluid duct section. By virtue of the embodiment according to the invention, a particularly flexibly deployable duct connecting unit can be provided. A particularly simple capacity for retrofitting can be obtained. A particularly high degree of operational reliability can furthermore be provided.

An auxiliary nozzle unit according to the invention is additionally proposed. The at least one auxiliary nozzle unit preferably has at least one spray valve element. The at least one spray valve element is preferably arranged on an end side of the auxiliary nozzle opening. The at least one spray valve element is configured for the purpose of varying a spray width of the discharged jet of wiper fluid. The at least one spray valve element is in particular configured for the purpose of varying a cross-section of the auxiliary nozzle opening. The at least one spray valve element is preferably configured for the purpose of varying the cross-section between a closed state of the at least one spray valve element and a maximum cross-section of the at least one auxiliary nozzle opening. The at least one spray valve element is preferably configured for the purpose of focusing and/or unfocusing the discharged jet of wiper fluid. By virtue of the embodiment according to the invention, the consumption of wiper fluid can advantageously be kept low. A particularly advantageously efficient discharge of wiper fluid can be obtained.

Furthermore, a wiper device with a wiper arm device according to the invention is moreover proposed. The wiper device preferably has a wiper arm adapter arranged on the wiper arm. The wiper device furthermore preferably has at least one wiper blade with a wiper blade adapter arranged on the wiper blade. The wiper arm adapter is in particular configured in order to be coupled to the wiper blade adapter. The wiper blade can preferably be coupled to the wiper arm by the wiper blade adapter being coupled to wiper arm adapter. The wiper device in particular has a wiper fluid duct unit. The wiper fluid duct unit preferably has at least one wiper fluid container, at least one wiper fluid duct, and/or at least one wiper fluid pump. The wiper fluid duct is preferably configured in order to convey wiper fluid from the wiper fluid container to a spray nozzle and/or auxiliary spray nozzle. The wiper fluid pump is preferably configured in order to convey wiper fluid from the wiper fluid container into the at least one wiper fluid duct. By virtue of the embodiment according to the invention, a particularly advantageously flexibly deployable and/or easily adaptable wiper device can be provided. Auxiliary spray nozzles can advantageously be easily retrofitted. A particularly high degree of efficiency during wiper fluid discharge can furthermore be obtained.

It is hereby intended that the wiper arm device according to the invention is not limited to the above described application and embodiment. In particular, the wiper arm device according to the invention can have a different number of individual elements, components, and units than that mentioned herein in order to fulfill a mode of functioning described herein. In addition, it is intended that, in the case of the value ranges stated in this document, values that lie within the limits mentioned are also considered to be disclosed and capable of being employed as desired.

BRIEF DESCRIPTION OF THE DRAWINGS

Further advantages will become apparent from the following description of the drawings. An exemplary embodiment of the invention is shown in the drawings. The drawings, the description, and the claims contain numerous features in combination. A person skilled in the art will expediently also consider the features individually and combine them in meaningful further combinations.

In the drawings.

DETAILED DESCRIPTION

Figure 1:
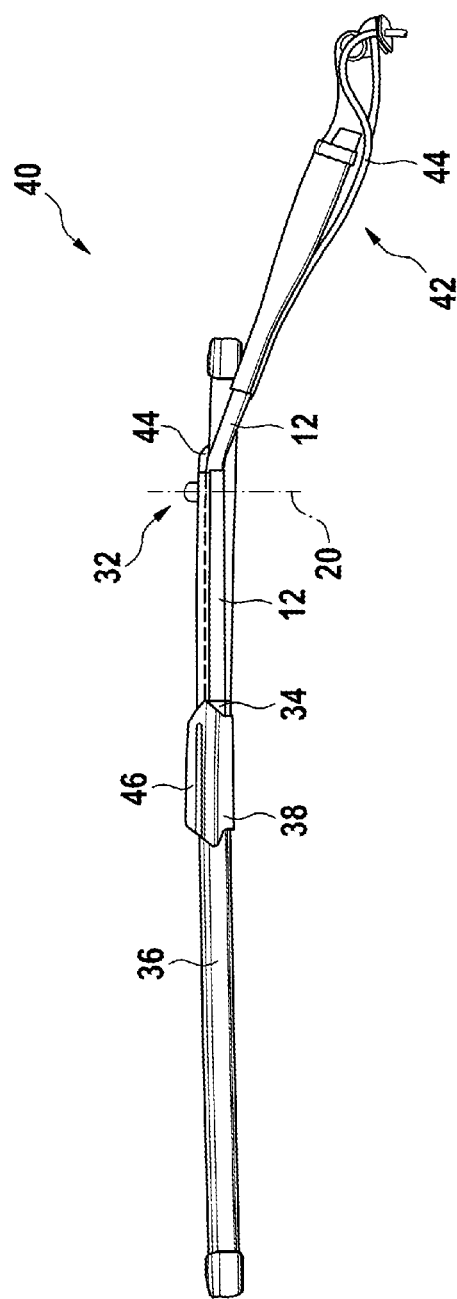
FIG. 1 shows a wiper device with a wiper arm device according to the invention in a schematic view.
Figure 2:
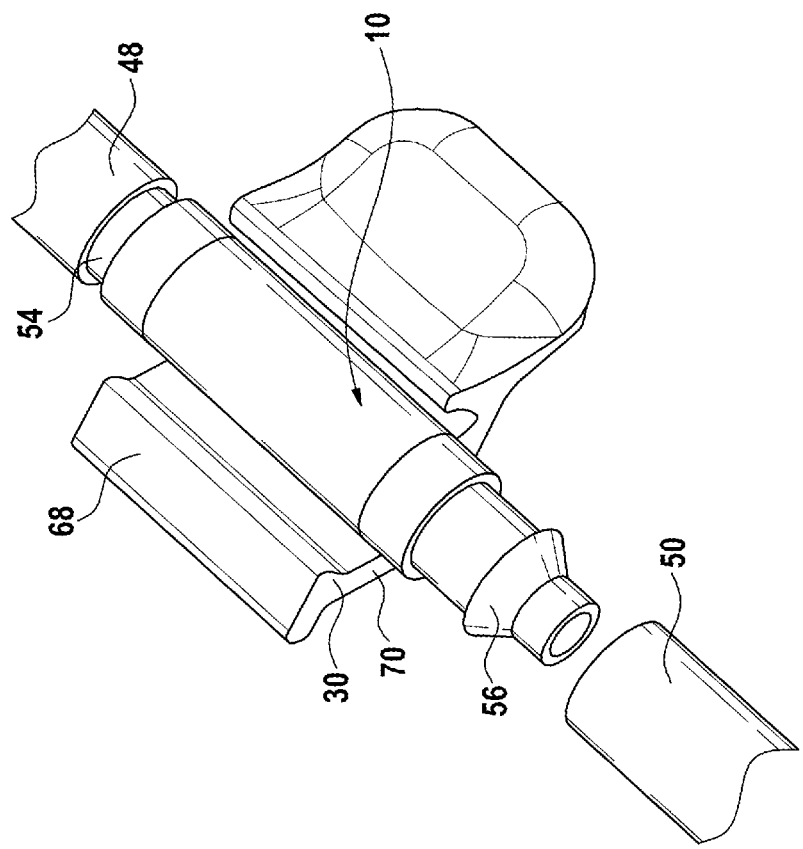
FIG. 2 shows a duct connecting unit with two duct connecting elements and two wiper fluid duct sections in a schematic view.
Figure 3:
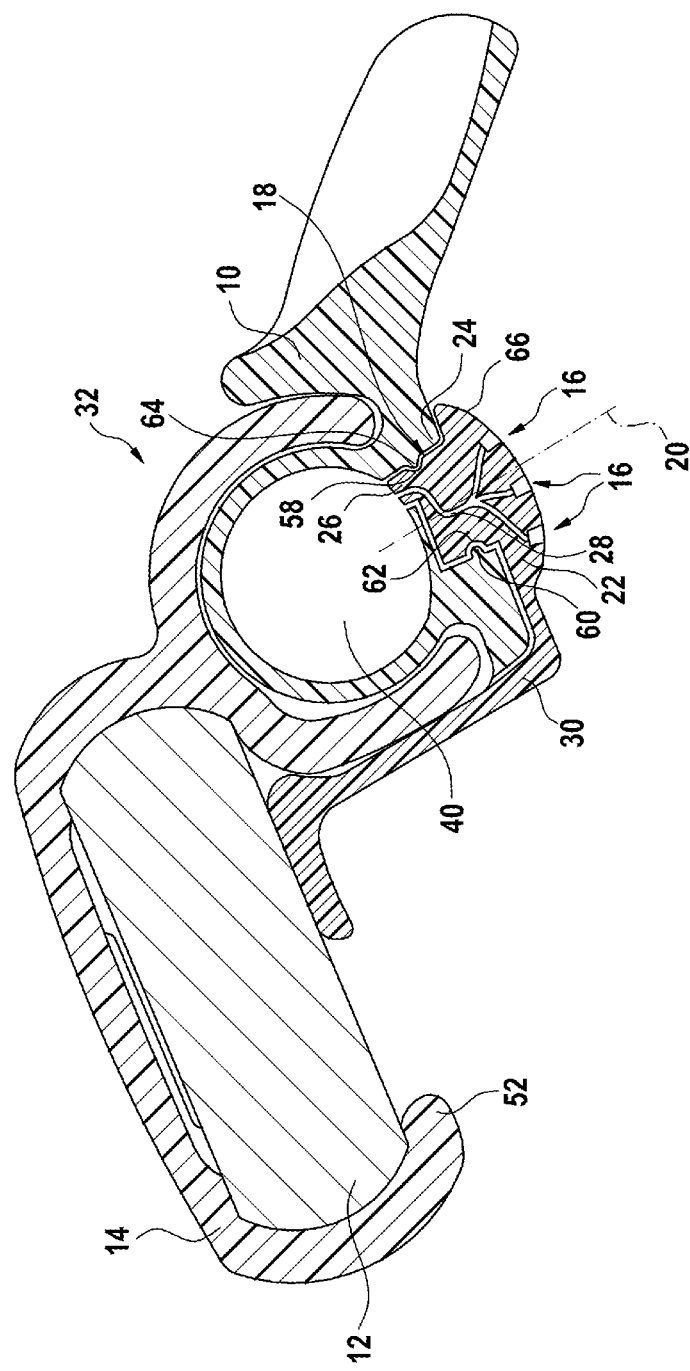
FIG. 3 shows a view in section through the wiper arm device according to the invention along the line of section II-II.
Figure 4:
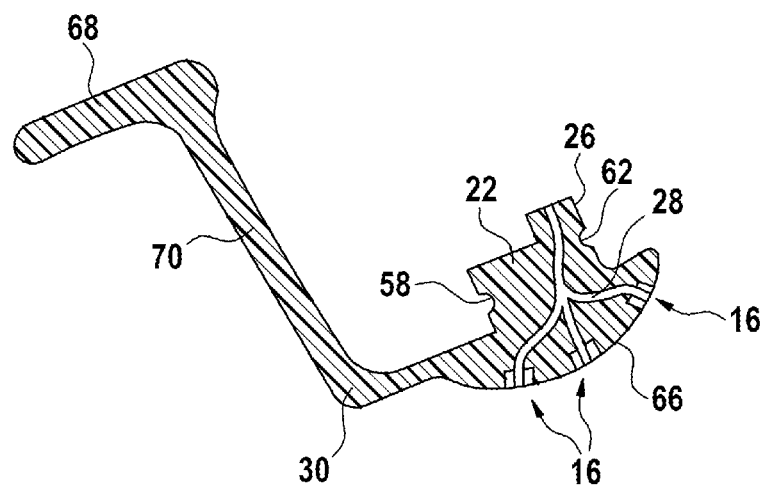
FIG. 4 shows a view in section through a connecting element of a connecting unit according to the invention.

FIG. 1 shows a schematic overall view of a wiper device 40. In the present case, the wiper device 40 is formed as a vehicle wiper, in particular as a car wiper. The wiper device 40 is shown in a mounted state. The wiper device 40 is configured, at least in a cleaning mode state, in order to clean a wiping surface of moisture and/or dirt. In the present case, the wiping surface takes the form of a glass pane, in particular a vehicle glass pane. It is in principle also conceivable that a glass pane takes the form of a window pane.

The wiper device 40 furthermore has a wiper arm 12. The wiper arm 12 has a main axis of extension. In a mounted state of the wiper arm 12, a main axis of extension of the wiper arm 12 is at least substantially parallel to a cleaning surface.

The wiper device 40 comprises a wiper blade 36. The wiper blade 36 forms a tight fit with the wiping surface in the mounted state. The wiper blade 36 has a main axis of extension. The main axis of extension of the wiper blade 36 is at least substantially parallel to the wiping surface. The main axis of extension of the wiper blade 36 is moreover at least substantially parallel to the main axis of extension of the wiper arm 12. At least in the cleaning mode state, the wiper blade 36 is configured in order to remove moisture and/or dirt from the wiping surface.

The wiper device 40 moreover comprises a wiper blade adapter 38. The wiper blade adapter 38 has a contact region with the wiper blade 36. The wiper blade adapter 38 is configured for connection of the wiper blade 36 to the wiper arm 12. The wiper arm 12 has a wiper arm adapter 34. The wiper arm adapter is configured for coupling to the wiper blade adapter 38.

The wiper device 40 has at least one main nozzle unit 46. The main nozzle unit 46 is configured for the purpose of applying wiper fluid to the wiping surface. The main nozzle unit 46 is configured for the purpose of discharging wiper fluid in a central region of the wiper blade 36. The main nozzle unit 46 is arranged in the region of the wiper blade adapter 38. The main nozzle unit 46 has at least one nozzle element (not shown). In the present case, the main nozzle unit 46 is formed as a multi jet nozzle unit which comprises multiple nozzle elements. The nozzle elements can here be arranged in a row. In the present case, the nozzle elements are arranged in a fan-like fashion.

The wiper device 40 furthermore has a wiper fluid duct unit 42. The wiper fluid duct unit 42 has a wiper fluid container (not shown in detail) and a wiper fluid pump. The wiper fluid duct unit 42 furthermore has a wiper fluid duct 44. The wiper fluid duct 44 is configured in order to convey wiper fluid. The wiper fluid duct 44 is configured in order to convey wiper fluid from the wiper fluid container at least to the main nozzle unit 46. The wiper fluid duct 44 extends along the wiper arm 12. The wiper fluid duct 44 is fluidically connected to the wiper fluid container. The wiper fluid duct 44 is placed along the wiper arm 12. The wiper fluid duct 44 extends substantially parallel to the main axis of extension of the wiper arm 12. The wiper fluid duct 44 can be formed from wiper fluid duct sections 48, 50 which are separated from each other.

The wiper device 40 moreover has a wiper arm device 32. The wiper arm device 32 has a duct connecting unit 10. The duct connecting unit 10 is configured in order to connect two wiper fluid duct sections 48, 50. The wiper arm device 32 furthermore has a duct retaining unit 14. The duct retaining unit 14 is configured in order to retain the duct connecting unit 10 on the wiper arm 12. The duct connecting unit 10 is configured in order to be coupled to the wiper arm 12 by means of the duct retaining unit 14. The duct connecting unit 10 has a duct connection retaining element which is formed as a one-piece clamping connecting element 52. The one-piece clamping connecting element 52 largely engages around the wiper arm 12 in a coupled state. The one-piece clamping connecting element 52 is furthermore configured in the coupled state in order to keep the duct retaining unit 14 clamped. The duct connecting unit 10 furthermore has two duct connecting elements 54, 56. The duct connecting elements 54, 56 each have a frustoconical region. The duct connecting elements 54, 56 are configured for the purpose of coupling to wiper fluid duct sections 48, 50. In a coupled state of one of the duct connecting elements 54, 56 to one of the wiper fluid duct sections 48, 50, one end of one of the wiper fluid duct sections 48, 50 is pushed over the frustoconical region. The frustoconical region is configured in order to prevent a wiper fluid duct section 48, 50 from sliding off and/or to prevent a wiper fluid duct section 48, 50 from becoming separated unwantedly from one of the duct connecting elements 54, 56.

The wiper arm device 32 furthermore has three auxiliary nozzle units 16. The wiper arm device 32 moreover has a connecting unit 18. The connecting unit 18 is configured in order to connect the three auxiliary nozzle units 16 non-destructively and detachably to the duct connecting unit 10. The connecting unit 18 has a connection axis 20 for the purpose of connecting the three auxiliary nozzle units 16 to the duct connecting unit 10. The connecting unit 18 has two connecting elements 22, 24. The connecting unit 18 has a first connecting element 22 and a second connecting element 24. The first connecting element 22 is configured in order to be connected to the second connecting element 24 along the connection axis 20. The connection axis 20 extends transversely to a main axis of extension of the duct connecting unit 10.

The first connecting element 22 is arranged on the three auxiliary nozzle units 16. The three auxiliary nozzle units 16 and the first connecting element 22 are formed integrally. In a separated state of the connecting unit 18, the first connecting element 22 is formed integrally with the three auxiliary nozzle units 16 or the duct connecting unit 10.

The first connecting element 22 is furthermore formed as a first plug-in coupling element 58. The second connecting element 24 is formed as a second plug-in coupling element 60. The two plug-in coupling elements 58, 60 are configured in order to be connected to each other along the connection axis 20 of the connecting unit 18. The first plug-in coupling element 58 is formed integrally with the three auxiliary nozzle units 16. The first plug-in coupling element 58 is moreover formed cylindrically. The first plug-in coupling element 58 furthermore has a clamping region 62. The clamping region 62 is formed as a recess delimited by the first plug-in coupling element 58. The recess is formed annularly around the connection axis 20 on a peripheral surface of the first plug-in coupling element 58. The second plug-in coupling element 60 is formed in the duct connecting unit 10 as a cutout delimited by a cylindrical contour. The cylindrical contour of the second plug-in coupling element 60 has a complementary clamping region formed as a projection 64. The projection 64 is formed integrally with the duct connecting unit 10. The projection 64 is formed with a shape that correlates with the clamping region 62. In the connected state of the two plug-in coupling elements 58, 60, the projection 64 is configured in order to engage in the clamping region 62. The projection 64 is configured in order to be squeezed during assembly and/or disassembly. In the connected state of the plug-in coupling elements 58, 60, the projection 64 is furthermore configured in order to retain the first plug-in coupling element 58 in a positive and force-fitting fashion. It is alternatively conceivable that the projection 64 is arranged on the first plug-in coupling element 58 and the clamping region 62 on the second plug-in coupling element 60. Furthermore, it is alternatively conceivable that the projection 64 is formed so that it can be exchanged or as a spring ring.

The first connecting element 22 moreover partially has a lens shape 66. The first plug-in coupling element 58 is formed on the lens shape 66. The three auxiliary nozzle units 16 are furthermore arranged on the lens shape 66. The three auxiliary nozzle units 16 are integrated into the lens shape 66.

The connecting unit 18 furthermore has an anti-rotation element 26. The anti-rotation element 26 is configured in order to secure the three auxiliary nozzle units 16 and the duct connecting unit 10 against rotational movement relative to one another in the connected state of the connecting unit 18. The anti-rotation element 26 is arranged on the first connecting element 22. The anti-rotation element 26 is arranged off-center with respect to the connection axis 20 on the first connecting element 22. The anti-rotation element 26 is furthermore formed integrally with the first connecting element 22. The second connecting element 24 furthermore has a receiving opening for receiving the anti-rotation element 26. The receiving opening is configured in order to receive the anti-rotation element 26 in a force-fitting fashion. In the connected state of the connecting unit 16, the anti-rotation element 26 is engaged with the receiving opening. In the connected state of the connecting unit 18, rotational movement of the first connecting element 22 with the three auxiliary nozzle units 16 relative to the second connecting element 24 is delimited positively by the engagement of the anti-rotation element 26 in the receiving opening. The anti-rotation element 26 is furthermore formed integrally with the three auxiliary nozzle units 16.

The anti-rotation element 26 at least partially delimits a fluid duct 28. The fluid duct 28 is furthermore delimited by the first connecting element 22. The fluid duct 28 is formed as a single piece with the anti-rotation element 26 and the first connecting element 22. The fluid duct 28 is fluidically connected to the duct connecting unit 10. The fluid duct 28 is furthermore fluidically connected to the three auxiliary nozzle units 16. The fluid duct 28 is configured in order to connect the duct connecting unit 10 fluidically to the three auxiliary nozzle units 16.

The connecting unit 18 furthermore has a support element 30. The support element 30 is configured in order to support the three auxiliary nozzle units 16 on the wiper arm 12. The support element 30 is furthermore configured in order to position the three auxiliary nozzle units 16 relative to the wiper arm 12. The support element 30 is arranged on the first connecting element 22. The support element 30 is furthermore rigidly connected to the first connecting element 22. The support element 30 has an integral connection to the lens shape 66 of the first connecting element 22. The support element 30 furthermore has a support surface 68. In the connected state of the connecting unit 18 and the coupled state of the duct retaining unit 14 to the wiper arm 12, the support surface 68 is configured in order to bear against a side wall of the wiper arm 12. The side wall of the wiper arm 12 and the support surface 68 are formed with shapes that correlate with each other. In the connected state of the connecting unit 18 and the coupled state of the duct retaining unit 14 to the wiper arm 12, the support surface 68 bears flat against the side wall of the wiper arm 12. The support surface 68 is rigidly connected to the lens shape 66 and the three auxiliary nozzle units 16 arranged thereon via a support arm 70. The support arm 70 is configured in order to transmit a supporting force from the support surface 68 to the first connecting element 22. It is alternatively conceivable that the first connecting element 22 is formed with the support element 30 as multiple parts.

What is claimed is:
1. A wiper arm device comprising
at least one duct connecting unit (10) for connecting at least two wiper fluid duct sections to each other,
at least one duct retaining unit (14) which can be arranged on at least one wiper arm (12) and is configured to retain at least the duct connecting unit (10) on the wiper arm (12),
at least one auxiliary nozzle unit (16), and
a connecting unit (18) configured to connect the at least one auxiliary nozzle unit (16) detachably to the duct connecting unit (10).

2. The wiper arm device according to claim 1, characterized in that the connecting unit (18) has a connection axis (20) for connecting the at least one auxiliary nozzle unit (16) to the duct connecting unit (10), the connection axis extending transversely with respect to a main axis of extension of the duct connecting unit (10).

3. The wiper arm device according to claim 1, characterized in that the connecting unit (18) has at least one connecting element (22) which is formed integrally with the at least one auxiliary nozzle unit (16) or the duct connecting unit (10).

4. The wiper arm device according to claim 1, characterized in that the connecting unit (18) has at least two connecting elements (22, 24) formed as plug-in coupling elements.

5. The wiper arm device according to claim 1, characterized in that the connecting unit (18) has at least one connecting element (22), which at least partially has a lens shape (66), on which the at least one auxiliary nozzle unit (16) is arranged.

6. The wiper arm device according to claim 1, characterized in that the connecting unit (18) has at least one anti-rotation element (26) which is configured to secure the at least one auxiliary nozzle unit (16) and the duct connecting unit (10) in a connected state of the connecting unit (18) against rotational movement relative to each other.

7. The wiper arm device according to claim 6, characterized in that the at least one anti-rotation element (26) is formed integrally with the at least one auxiliary nozzle unit (16).

8. The wiper arm device according to claim 6, characterized in that the at least one anti-rotation element (26) has a fluid duct (28) for a fluidic connection of the at least one auxiliary nozzle unit (16) to the duct connecting unit (10).

9. The wiper arm device according to claim 1, characterized in that the connecting unit (18) has at least one support element (30) which is configured to support the at least one auxiliary nozzle unit (16) on the wiper arm (12) and/or position the at least one auxiliary nozzle unit (16) relative to the wiper arm (12).

10. The wiper arm device according to claim 1, characterized in that the connecting unit (18) is configured to non-destructively connect the at least one auxiliary nozzle unit (16) detachably to the duct connecting unit (10).

11. A wiper device with at least one wiper arm device according to claim 1, with a wiper arm adapter (34) arranged on the wiper arm (12), with a wiper blade (36), and with a wiper blade adapter (38) arranged on the wiper blade (36) for coupling to the wiper arm adapter (34).

12. The wiper device according to claim 11, characterized in that the connecting unit (18) has a connection axis (20) for connecting the at least one auxiliary nozzle unit (16) to the duct connecting unit (10), the connection axis extending transversely with respect to a main axis of extension of the duct connecting unit (10).

13. The wiper device according to claim 11, characterized in that the connecting unit (18) has at least one connecting element (22) which is formed integrally with the at least one auxiliary nozzle unit (16) or the duct connecting unit (10).

14. The wiper device according to claim 11, characterized in that the connecting unit (18) has at least two connecting elements (22, 24) formed as plug-in coupling elements.

15. The wiper device according to claim 11, characterized in that the connecting unit (18) has at least one connecting element (22), which at least partially has a lens shape (66), on which the at least one auxiliary nozzle unit (16) is arranged.

16. The wiper device according to claim 11, characterized in that the connecting unit (18) has at least one anti-rotation element (26) which is configured to secure the at least one auxiliary nozzle unit (16) and the duct connecting unit (10) in a connected state of the connecting unit (18) against rotational movement relative to each other.

17. The wiper device according to claim 16, characterized in that the at least one anti-rotation element (26) is formed integrally with the at least one auxiliary nozzle unit (16).

18. The wiper device according to claim 16, characterized in that the at least one anti-rotation element (26) has a fluid duct (28) for a fluidic connection of the at least one auxiliary nozzle unit (16) to the duct connecting unit (10).

19. The wiper device according to claim 11, characterized in that the connecting unit (18) has at least one support element (30) which is configured to support the at least one auxiliary nozzle unit (16) on the wiper arm (12) and/or position the at least one auxiliary nozzle unit (16) relative to the wiper arm (12).

20. The wiper device according to claim 11, characterized in that the connecting unit (18) is configured to non-destructively connect the at least one auxiliary nozzle unit (16) detachably to the duct connecting unit (10).

21. The wiper arm device according to claim 1, wherein the connecting unit (18) has at least one anti-rotation element (26) which is configured to secure the at least one auxiliary nozzle unit (16) and the duct connecting unit (10) in a connected state of the connecting unit (18) and prevent rotational movement of the connecting unit (18) relative to the auxiliary nozzle unit (16) in a first rotational direction, wherein the connecting unit (18) also has at least one support element (30) which is configured to support the at least one auxiliary nozzle unit (16) on the wiper arm (12) and position the at least one auxiliary nozzle unit (16) relative to the wiper arm (12), and wherein the at least one support element (30) is configured to prevent rotational movement of the connecting unit (18) relative to the auxiliary nozzle unit (16) in a second, opposite rotational direction.

\* \* \* \* \*